J. S. & T. B. ATTERBURY.

METHOD OF MAKING SMOKE-BELLS.

No. 6,886. Reissued Feb. 1, 1876.

WITNESSES.

James L. Kay

L. C. Fitter

INVENTOR.

James S. Atterbury

Thomas B. Atterbury by Bakewell & Kerr Attys

UNITED STATES PATENT OFFICE.

JAMES S. ATTERBURY AND THOMAS B. ATTERBURY, OF PITTSBURG, PA., ASSIGNORS TO DITHRIDGE & CO., OF SAME PLACE.

IMPROVEMENT IN METHODS OF MAKING SMOKE-BELLS.

Specification forming part of Letters Patent No. 57,063, dated August 14, 1866; reissue No. 6,886, dated February 1, 1876; application filed December 22, 1875.

*To all whom it may concern:*

Be it known that we, JAMES S. ATTERBURY and THOMAS B. ATTERBURY, of Pittsburg, in the county of Allegheny and State of Pennsylvania, have invented a new and useful Improved Method of Making Smoke-Bells; and we do hereby declare the following to be a full, clear, and exact description thereof, reference being had to the accompanying drawing, making a part of this specification, in which—

Figure 1:
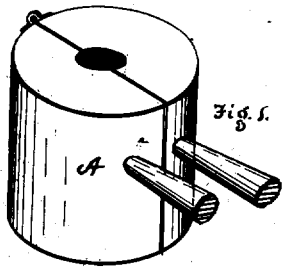
Figure 2:
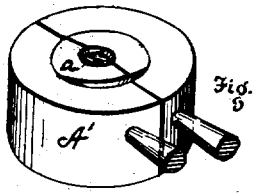
Figure 3:
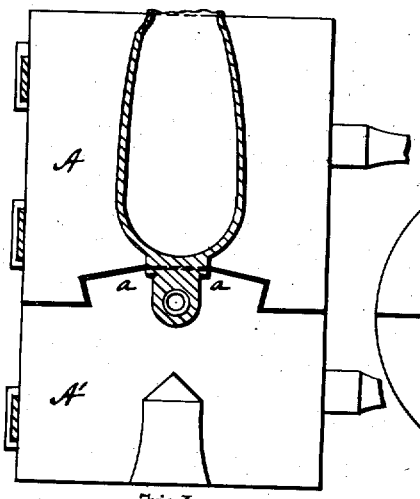
Figure 4:
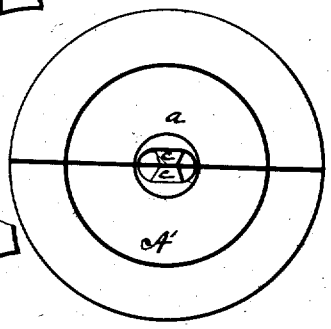
Figure 5:
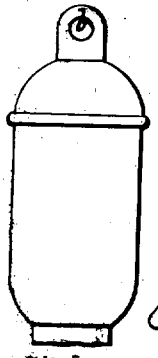
Figure 6:
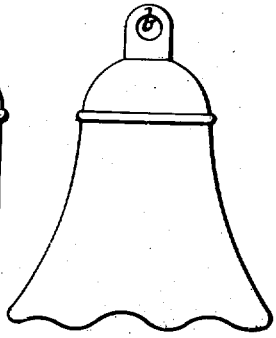
Figure 7:
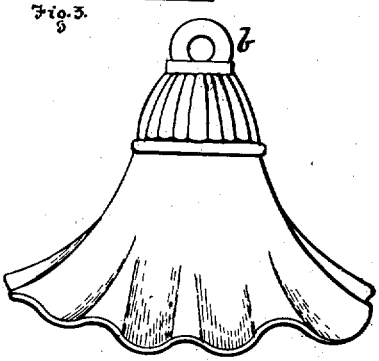
Figure 8:
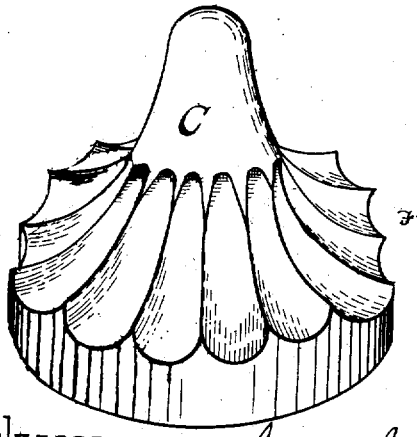
Figure 9:
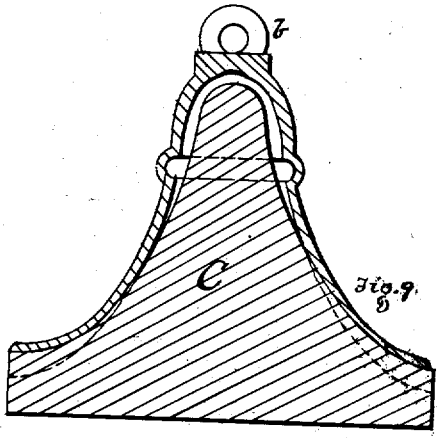

Figure 1 is a perspective view of the upper part of the divided mold. Fig. 2 is a perspective view of the lower half of the mold. Fig. 3 is a view of one-half of the two molds put together, showing the form of the glass bell when molded in the same. Fig. 4 is a top view of the lower portion of the mold. Fig. 5 shows the form of the molded glass preparatory to shaping the lower end. Fig. 6 is a side view of a complete smoke-bell. Fig. 7 is a perspective view of a bell after it has been finished on the crimping or fluting former. Fig. 8 is a perspective view of the crimping or fluting former, by which the crimped or fluted form is imparted to the open end of the bell. Fig. 9, by a vertical section, illustrates the last-mentioned operation, the bell being shown on the former, the section being through the projecting edges.

To enable others skilled in the art to practice our invention, we will describe the apparatus used.

Our invention consists, first, in forming the eye or loop, by which the smoke-bell is suspended and handled by means of projections extending from the sides of the divided mold so as to meet when it is closed; second, in crimping or fluting the open end of the previously-formed article by means of a tapered form having edges, by which the crimps or flutes are formed; third, in a former having radial projecting edges, for crimping or fluting the article.

A A′ are ordinary two-part molds, united by the ordinary dovetail joint *a*. The cavity of the mold is such as to produce the smoke-bell required, one end of which is open and of cylindrical form. (See Fig. 5). The lower section is provided with two projections, *c*, one on each half, which, when the mold is closed, meet centrally.

When the article is blown, the loop or eye is made, and the opening of the mold A′ withdraws the projections and frees the article, so that it can be taken out to be crimped or fluted. The glass, having been blown, is then reheated, and flared and crimped by pressing it over the fluted former C, the latter being inserted into the open end of the smoke-bell.

By this method of finishing we can produce a highly ornamental and very beautiful article without the aid of skillful labor, and consequently reduce the cost of production.

What we claim as our invention, and desire to secure by Letters Patent, is—

1. The method herein described of forming the eye or loop of the smoke-bell by projections on the inside of the mold, which, when the latter is closed, extends across the forming cavity.

2. The method of crimping or fluting glass smoke-bells and other articles by means of a former, having radially-projecting edges, herein described.

3. The former, for crimping or fluting glass smoke-bells and other articles, having radially-projecting edges, as described.

In witness whereof we, the said JAMES S. ATTERBURY and THOMAS B. ATTERBURY, have hereunto set our hands.

JAS. S. ATTERBURY.
THOS. B. ATTERBURY.

Witnesses:
D. S. ANDERSON,
B. F. COLLINS,
T. B. KERR.